United States Patent
Vogt (10) Patent No.: US 10,866,586 B2
(45) Date of Patent: Dec. 15, 2020

(54) REMOTE CONTROL METHOD FOR A DRIVER ASSISTANCE SYSTEM, DRIVER ASSISTANCE SYSTEM, AND MOTOR VEHICLE PROVIDED THEREWITH

(71) Applicant: AUDI AG, Ingolstadt (DE)

(72) Inventor: Hermann Vogt, Eichstätt (DE)

(73) Assignee: AUDI AG, Ingolstadt (DE)

( * ) Notice: Subject to any disclaimer, the term of this patent is extended or adjusted under 35 U.S.C. 154(b) by 135 days.

(21) Appl. No.: 16/020,198

(22) Filed: Jun. 27, 2018

(65) Prior Publication Data

US 2019/0025816 A1 Jan. 24, 2019

(30) Foreign Application Priority Data

Jul. 18, 2017 (DE) .................. 10 2017 212 221

(51) Int. Cl.
*G05D 1/00* (2006.01)
*B60W 30/06* (2006.01)
*G05D 1/02* (2020.01)
*G08G 1/16* (2006.01)

(52) U.S. Cl.
CPC ........... *G05D 1/0022* (2013.01); *B60W 30/06* (2013.01); *G05D 1/0011* (2013.01); *G05D 1/0016* (2013.01); *G05D 1/0212* (2013.01); *G05D 1/0246* (2013.01); *G05D 1/0285* (2013.01); *B60W 2556/45* (2020.02); *G05D 2201/0213* (2013.01); *G08G 1/168* (2013.01)

(58) Field of Classification Search
None
See application file for complete search history.

(56) References Cited

U.S. PATENT DOCUMENTS

| 10,002,525 B2* | 6/2018 | Scheerle | B60R 16/023 |
| 2017/0008521 A1* | 1/2017 | Braunstein | G05D 1/0278 |
| 2017/0129537 A1* | 5/2017 | Kim | G05D 1/0011 |

FOREIGN PATENT DOCUMENTS

| DE | 10 2009 041 587 A1 | 3/2011 | |
| DE | 10 2009 043 589 A1 | 3/2011 | |
| DE | 102009043589 A1 * | 3/2011 | ............... B62D 1/00 |
| DE | 10 2013 010 819 A1 | 12/2014 | |
| DE | 10 2013 213 029 A1 | 1/2015 | |

* cited by examiner

*Primary Examiner* — Abdhesh K Jha
(74) *Attorney, Agent, or Firm* — Maier & Maier, PLLC (57) ABSTRACT

A remote control method for remote control of a driver assistance system of a motor vehicle by a remote control unit assigned to the motor vehicle, wherein the driver assistance system is designed to actuate the motor vehicle for carrying out an autonomous or piloted parking operation, and which includes an optical sensor apparatus having at least one sensor, an analysis unit and a control unit.

9 Claims, 5 Drawing Sheets

REMOTE CONTROL METHOD FOR A DRIVER ASSISTANCE SYSTEM, DRIVER ASSISTANCE SYSTEM, AND MOTOR VEHICLE PROVIDED THEREWITH

FIELD

Exemplary embodiments of the invention relate to a remote control method for a driver assistance system. The invention further relates to a driver assistance system and to a motor vehicle provided therewith.

BACKGROUND

Remotely controlled driver assistance systems are increasingly finding their way into modern motor vehicles. Such driver assistance systems are utilized, for example, in parking operations. The parking operation can thereby take place by the motor vehicle in a fully autonomous manner; the parking operation can also be controlled by the driver by means of remote control. Parking operations of this kind are desired, because the driver no longer needs to be present in the motor vehicle in order to park it. Accordingly, smaller parking spaces can be utilized and this can reduce the surface area used for parking spaces, in particular in urban regions.

In the above-mentioned and similar remote control situations, however, a safeguard is required in order to be able to impede or totally prevent any misuse. During remote control, the driver or operator shall remain in the vicinity of the motor vehicle but not be present in it. Accordingly, a maximum distance between the remote control unit and the outer contour of the vehicle should not be exceeded and the remote control should not be possible from inside the vehicle. In addition, there should be a "dead-man's" function, which brings about a discontinuation of the parking operation in the event that difficulties arise.

DE 10 2009 041 587 A1 discloses a driver assistance device, which comprises a control apparatus and with which the driver of a motor vehicle can simply detect a dangerous situation during an autonomous parking operation of the motor vehicle. The control apparatus is designed for the purpose of emitting control signals to a drive device or steering device of the motor vehicle, which prompt an autonomous parking operation to be carried out. The control apparatus is further designed to receive commands from a remote control unit and, after receiving a predetermined discontinuation command, to discontinue an already begun parking operation of the motor vehicle. At least one camera is coupled to the control apparatus and acquires image data about a region surrounding the motor vehicle. The control apparatus transmits signals to the remote control unit, said signals comprising image data acquired by the camera or image data computed from the signals.

DE 10 2009 043 589 A1 discloses a method for remote control of a driver assistance system of a motor vehicle by means of a remote control unit, wherein the driver assistance system and the remote control each have a transmitting and receiving unit, and the communication between the remote control and the driver assistance system takes place by means of electromagnetic waves, for which a measurement of the transit time of the electromagnetic waves between the remote control unit and the driver assistance system is carried out, in which the distance between the remote control unit and the driver assistance system is determined from the transit time measurement, and in which a driver assistance function of the driver assistance system is activated by the remote control only when the distance between the remote control unit and driver assistance system is less than or equal to a predetermined maximum range.

DE 10 2013 213 029 A1 discloses a method for determining a position of a device assigned to a motor vehicle in relation to the vehicle. In the method, a plurality of ultrasound signals are transmitted in a predetermined time sequence by a plurality of different transmitter positions at the vehicle. The plurality of ultrasound signals are received at the device and the position of the device is determined as a function of the received ultrasound signals and the predetermined time sequence.

With the known means, however, only a relatively imprecise positional determination or distance determination with respect to the remote control unit is possible. Also, no possibility is provided to prevent the driver from sitting in the vehicle during the remote control. In addition, it is not possible to compel permanent visual contact between the driver and the motor vehicle.

SUMMARY

The invention is based on the object of presenting a method that enables a better safeguard of autonomous or piloted parking operations and of presenting devices for carrying out the method. "Piloted" here means remotely controlled.

The invention creates a remote control method for the remote control of a driver assistance system of a motor vehicle by means of a remote control unit assigned to the motor vehicle, wherein the driver assistance system is designed to actuate the motor vehicle for carrying out an autonomous or piloted parking operation and comprises an optical sensor apparatus with at least one sensor, an analysis unit, and a control unit, with the steps:

a) emission of a coded optical signal by the remote control unit;
b) detection of a surrounding region of the motor vehicle by means of the at least one sensor of the optical sensor apparatus in order to detect the coded optical signal and in order to acquire optical sensor data;
c) analysis of the sensor data by means of the analysis unit, wherein a distance between the remote control unit and the motor vehicle is determined; and
d) actuation of the motor vehicle by means of the control unit depending on the determined distance.

The optical sensor apparatus detects only the surroundings of the vehicle. Accordingly, a remote control from inside the vehicle is impeded or prevented. The sensor data are evaluated by means of image analysis methods that are known in and of themselves. The sensor data contain information about the surrounding region and, if appropriate, about the coded optical signal. The coded optical signal can be detected in the sensor data by the analysis unit, so that the remote control unit can be identified. A coded optical signal that does not belong to the motor vehicle is ignored, whereas the coded optical signal assigned to the motor vehicle is further processed. By means of the image analysis, a higher precision in the distance measurement can be achieved, so that the exceeding of the permitted maximum distance is better detected. Moreover, the allowed maximum distance can be defined in nearly any way in the region surrounding the motor vehicle. The control signals transmitted by the remote control unit are preferably transmitted at radio frequency.

It is preferred that, in step a), the coded optical signal is emitted by means of a coded optical marker and/or a display and/or a lamp apparatus, which emits coded optical pulses, is provided. The coded optical marker can be, for example, a barcode, a QR code, or the equivalent. Advantageously, the coded optical marker can be placed on mobile devices, so that this device then becomes the remote control unit. On the display, a barcode, a QR code, or the equivalent can be shown, so that the display can function similarly to the coded optical marker. The lamp apparatus preferably comprises a light, an infrared light, and/or a flashing light.

It is preferred that the remote control unit is designed as a mobile telecommunication device, in particular as a smartphone. By means of an app, any mobile telecommunication device or smartphone can be converted to a remote control unit in accordance with required authentication measures. Advantageously, the display, the light, the infrared light, and/or the flashing light of the mobile telecommunication device or smartphone is/are used.

It is preferred that, in step b), at least one sensor is designed as a camera unit, which outputs image data as sensor data. The camera unit is preferably an area-view camera of the motor vehicle. The camera unit has an adequate resolution and imaging accuracy to determine reliably the distance between the remote control unit and the motor vehicle on the basis of the image data. Therefore, no additional sensors are required in order to detect the coded optical signals of the remote control unit.

It is preferred that, in step c), the distance is determined on the basis of the sensor data of solely one sensor and a distance reference. With a knowledge of the imaging characteristics, on the basis of a distance reference, such as, for instance, a vehicle body edge (e.g., an edge of the hood or of the tailgate), and using the intercept theorem, it is possible to determine the distance between the remote control unit and the motor vehicle in a way that is known in and of itself.

It is preferred that, in step c), the distance is determined on the basis of the sensor data of at least two sensors, the sensor regions of which overlap. This is also known as the stereoscopic principle and essentially reproduces the human visual process. From two overlapping sensor regions, which, however, are slightly offset in one direction, it is easily possible to determine the distance of objects that are arranged in both sensor regions in a way that is known in and of itself.

It is preferred that, in step c), the coded optical signal is only taken into consideration when the analysis unit determines that the coded optical signal was detected in a predetermined detection region. The detection region is preferably provided in front of and/or in back of the vehicle. The detection region is preferably a subregion of the surrounding region. For this configuration, the operator has to be situated in a specific detection region in order for the coded optical signal to be accepted. Accordingly, the operator can be assigned on the operating side, for example, to an appropriate place for controlling/monitoring the parking operation.

It is preferred that, in step d), the control unit actuates the motor vehicle to interrupt the parking operation when the control unit determines that the distance is greater than a predetermined maximum distance. In this case, the operator is too far away from the vehicle, so that the parking operation is interrupted.

It is preferred that, in step d), the control unit actuates the motor vehicle to discontinue the parking operation when the analysis unit determines that no coded optical signal is detected and/or the coded optical signal is detected outside of the detection region. In this case, the line of sight between the remote control unit and the optical sensor apparatus is broken. This can occur, for example, on account of an obstacle, such as, for instance, a person passing through the line of sight. It is also conceivable that the coded optical signal is not emitted in the direction of the motor vehicle when, for example, the remote control unit is turned away from the vehicle. The same thing also applies in the case when the coded optical signal is present outside of the detection region.

It is preferred that, in step a), the coded optical signal is emitted solely in an angular range that encloses an angle smaller than a right angle and, in particular, less than 45°, more particularly less than 30°. With this embodiment, the parking operation is already discontinued when the remote control unit is turned away from the motor vehicle. This is also referred to as a loss of focus. The operator is therefore compelled to face at all times toward the motor vehicle.

It is preferred that, in step d), the control unit actuates the motor vehicle to proceed with the parking operation when the control unit determines that the distance is less than or equal to a predetermined maximum distance. It is preferred that, in step d), the control unit actuates the motor vehicle to proceed with the parking operation when the analysis unit determines that a coded optical signal is detected. When the operator has assumed a stipulated position once again, the parking operation can be resumed—if appropriate, after an additional manual confirmation.

It is preferred that the driver assistance system comprises another remote control unit, which is designed to emit additional coded optical signals, wherein, at the discretion of an operator, either the coded optical signals of the remote control unit or the additional coded optical signals of the additional remote control unit are taken into consideration or provided. With this embodiment, two operators can control or monitor the parking operation. In this case, only one of the operators can control the driver assistance system; however, the operator who is active at the moment can then hand over the focus or the control management for the driver assistance system to the other operator. Accordingly, it is possible to better control, for instance, forward and backward maneuvering.

Preferably, the method comprises the step:
e) transmission of the distance and/or of the output of the control unit to the remote control unit, in particular by means of radio frequency, in order to indicate the current operating state to the operator. Here, the operator is constantly informed about the current state. The transmission occurs preferably by means of radio frequency.

Accordingly, the operator can be warned of a loss of focus, detect an acquired focus, or be alerted about any interruptions of the parking operation.

It is preferred that the step a) and/or the step b) and/or the step c) is/are carried out in continuous repetition or in intermittent repetition. With this approach, the parking operation is steadily monitored. The procedure can take place with constant repetition; however, it is also conceivable that the steps are carried out within intervals of time that are repeated and are spaced apart in time from one another.

The invention further creates a driver assistance system that is designed to actuate a motor vehicle for carrying out an autonomous or a piloted parking operation, wherein the driver assistance system comprises:
 a remote control unit, which is assigned to the motor vehicle and is designed to emit a coded optical signal.
 an optical sensor apparatus, which is designed to detect a region surrounding the motor vehicle in order to acquire sensor data;

an analysis unit, which is designed to determine, on the basis of the sensor data, a distance between the remote control unit and the motor vehicle; and a control unit, which is designed to actuate the motor vehicle depending on the determined distance.

The invention further provides a motor vehicle comprising a preferred driver assistance system.

With the devices according to the invention, it is possible to realize advantages similar to those of the method according to the invention.

The invention also includes enhancements of the devices according to the invention, which have features such as those already described in connection with the enhancements of the method according to the invention. For this reason, the corresponding enhancements of the devices according to the invention are not described here once again.

It should be noted that the statements a), b) etc. in the listing of the method steps serve solely for readier reference; they do not establish any sequence. The invention also accordingly includes any technically reasonable sequence of method steps, including simultaneously carrying out a plurality of steps or all steps.

BRIEF DESCRIPTION OF EXEMPLARY EMBODIMENTS OF THE DRAWINGS

Exemplary embodiments of the invention are described below on the basis of schematic drawings. Shown for this purpose are.

DETAILED DESCRIPTION

The exemplary embodiments explained below involve preferred embodiments of the invention. In the exemplary embodiments, the described components of the embodiments each represent individual features of the invention, which are to regarded as being independent of one another and which the invention also further develops independently of one another in each instance, and hence are to be regarded also individually or in a combination different from that shown as belonging to the invention. Furthermore, the described embodiments can also be elaborated further by the already described features of the invention.

In the figures, functionally identical elements are each furnished with the same reference numbers.

Figure 1:
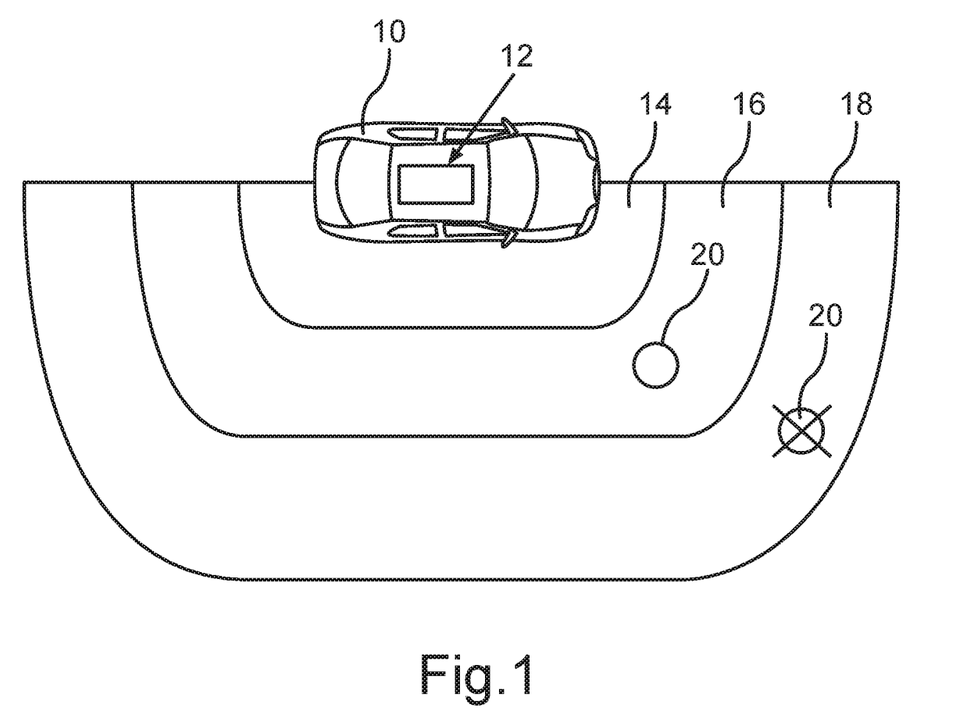
FIG. 1 shows an exemplary embodiment of a motor vehicle.

Reference is made, first of all, to FIG. 1, which shows a motor vehicle 10 having a driver assistance system 12. Surrounding the motor vehicle 10, a key region 14, a remote control region 16, and a radio frequency region 18 are specified. In the key region 14, which extends from the outer contour of the motor vehicle 10 out to about 1 m, the motor vehicle 10 can be opened with a keyless ID transponder in the usual way. On account of the arrangement of the associated antennas of the key region 14 and the incorporated materials of the motor vehicle 10, the key region 14 is designed to be asymmetric and non-uniform.

In the remote control region 16, an operation of the motor vehicle 10 or of the driver assistance system 12 by an operator 20 is intended to be possible. The remote control region 16 extends from the outer contour of the motor vehicle 10 out to a predetermined maximum distance $d_{max}$ of about 6 m.

Adjoining the remote control region 16 is the radio frequency region 18, in which a radio frequency communication with the motor vehicle 10 is fundamentally possible. The radio frequency region 18 extends out to a distance of about 10 m from the outer contour of the motor vehicle 10. This corresponds to the typical class 2 Bluetooth range. In the radio frequency region 18, the remote control is intended to be no longer possible for the operator 20.

Figure 2:
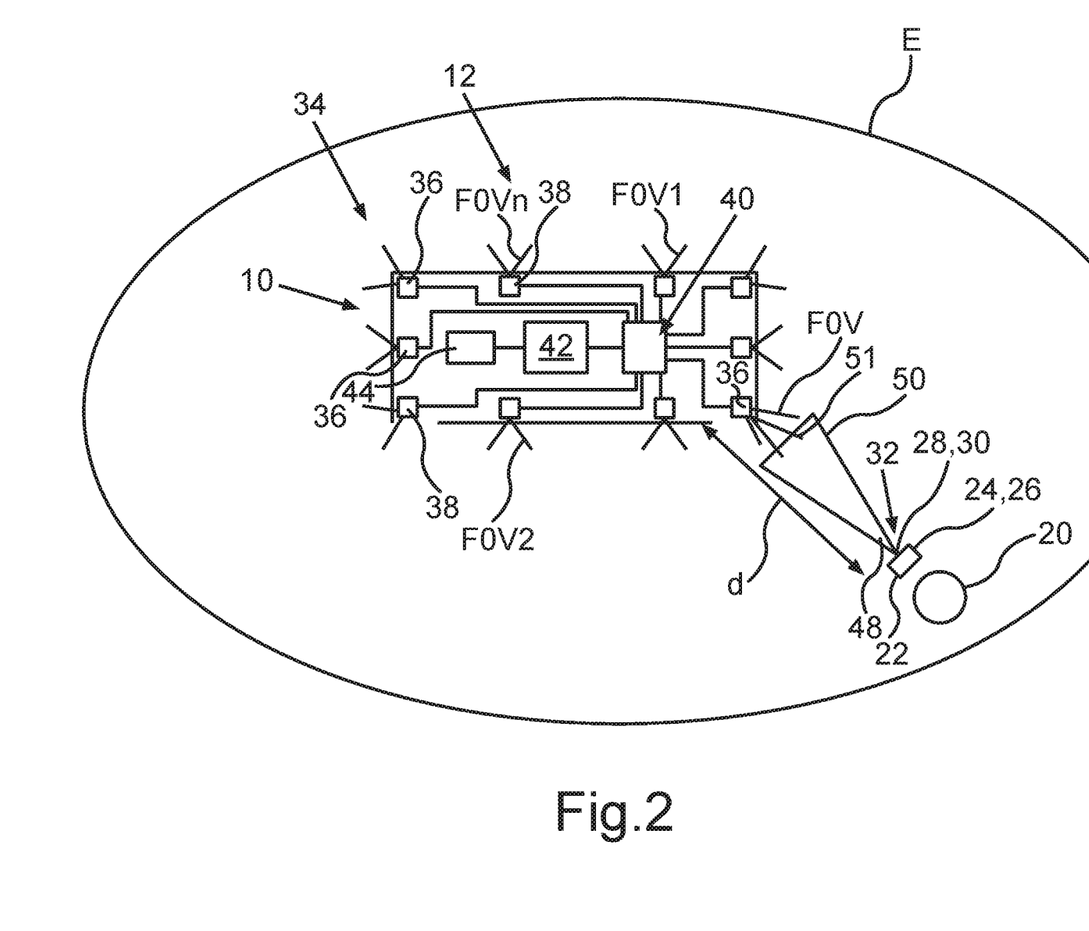
FIG. 2 shows a detailed view of the motor vehicle from FIG. 1.

As can be seen from FIG. 2, the operator 20 holds a remote control unit 22. The remote control unit 22 is designed, for example, as a mobile telecommunication device 24, in particular as a smartphone 26. The remote control unit 22 has a coded optical marker 28 in the form of a QR code, for example. Alternatively or additionally, the remote control unit 22 has a lamp apparatus 30, which can emit coded optical pulses 32.

The driver assistance system 12 comprises an optical sensor apparatus 34, which is arranged at the motor vehicle 10. The optical sensor apparatus 34 is designed to detect a surrounding region E of the motor vehicle 10, and, on the basis thereof, to output sensor data. The optical sensor apparatus 34 is further designed to detect the coded optical signal, in particular the coded optical pulses 32.

The optical sensor apparatus 34 comprises a plurality of sensors 36, which, as regarded in plan view, are distributed over the periphery of the motor vehicle 10. The sensors 36 each have a sensor region in which a detection is possible. One or a plurality of sensors 36 can be designed as a camera unit 38. The camera units 38 each have a field of view FOV, FOV1, FOV2, ..., FOVn, within which image data of the surrounding region E are detected and can be output as sensor data. Accordingly, the fields of view FOV, FOV1, FOV2, ..., FOVn constitute an example of sensor regions.

The driver assistance system 12 further comprises an analysis unit 40, which is designed to analyze sensor data or image data. The analysis unit 40 is capable of carrying out known image processing methods and, on the basis of the sensor data, of detecting the coded optical signal or the coded optical pulses 32. The analysis unit 40 is further designed to determine a distance d between the motor vehicle 10 and the remote control unit 22.

In addition, the driver assistance system 12 has a control unit 42, which is designed to actuate, based on the determined distance d, the motor vehicle 10 or, more precisely, a steering and drive apparatus 44 of the motor vehicle 10. In addition, the control unit 42 actuates the motor vehicle 10 in such a way that, optionally, an autonomous or piloted parking operation is carried out.

Figure 3:
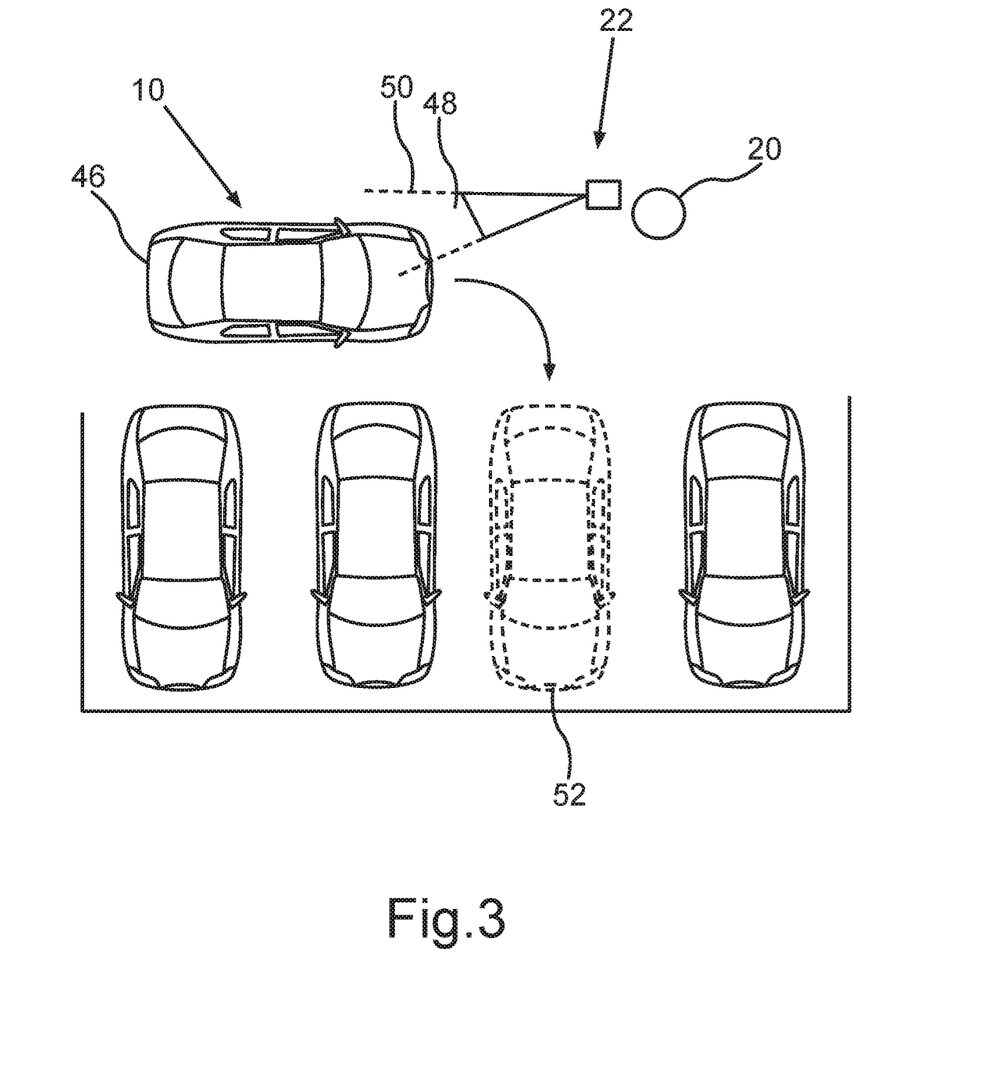
FIG. 3 shows an exemplary embodiment of a parking operation.
Figure 5:
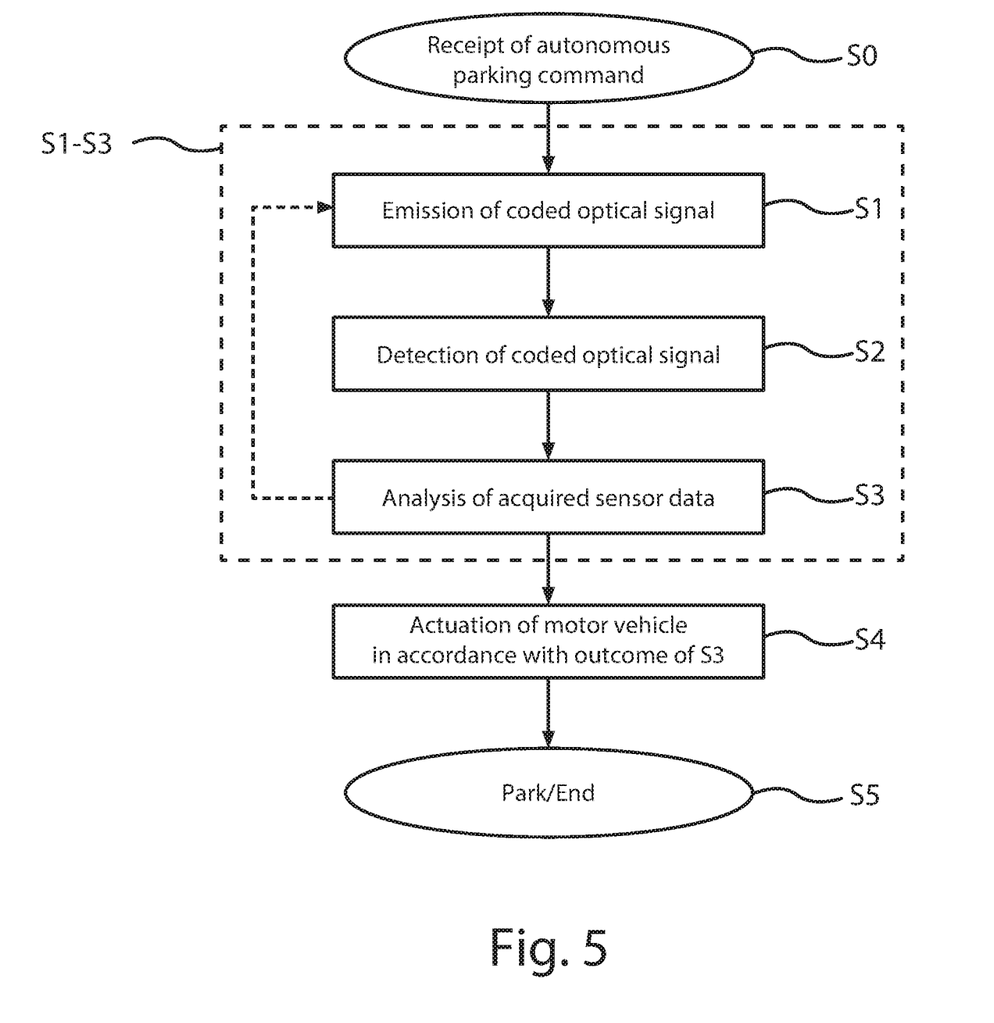
FIG. 5 shows an exemplary embodiment of a remote control method.

Next, reference is made to FIGS. 2, 3 and 5, on the basis of which an exemplary embodiment of a remote control method is explained in detail.

In a preparatory step S0, the motor vehicle 10 is situated in an initial position 46. By means of the remote control unit 22, the operator 20 issues the command for autonomous parking, which is transmitted by means of radio frequency, for example, to the motor vehicle 10. The control unit 42 then begins to control the autonomous parking operation.

In an emission step S1, the remote control unit 22 emits a coded optical signal, in particular the coded optical pulses 32, by means of the optical marker 28 and/or the lamp apparatus 30. The coded optical signal is emitted in an angular range 48. The angular range 48 is bounded by an edge region 50, which forms a continuous transition and presents no sharp boundary.

In a detection step S2, the optical sensor apparatus 34 detects the coded optical signal, provided that the operator 20 has pointed the remote control unit 22 at the motor vehicle 10. The coded optical signal is then detected by one of the sensors 36 with field of view FOV. The sensor data produced by the optical sensor apparatus 34 therefore contains information as to whether the coded optical signal was or was not detected.

In an analysis step S3, the analysis unit 40 analyzes the acquired sensor data. The analysis unit 40 initially detects, on the basis of the coded optical signal, whether the remote control unit 22 is assigned to the motor vehicle 10 and therefore is authorized to issue control commands. If the analysis unit 40 establishes that the remote control unit 22 is not authorized, the corresponding coded optical signal is ignored. The analysis unit 40 further determines whether the coded optical signal was detected in an allowed detection region 51, which is a subregion of the field of view FOV. If it is determined that the coded optical signal was not detected within the detection region 51, then the coded optical signal is ignored. Otherwise, the analysis unit 40 determines, by means of an image analysis method that is known in and of itself, the distance d between the remote control unit 22 and the motor vehicle 10. The determined distance d is output to the control unit 42. If no distance d was determined, because the coded optical signal was ignored or was not detected, then this information is also transmitted to the control unit 42, for example, as a negative distance value of the distance d.

In a control step S4, the control unit 42 actuates the motor vehicle 10, in particular the steering and drive apparatus 44, in accordance with the outcome of the analysis step S3. If the determined distance d is greater than the predetermined maximum distance $d_{max}$, then the motor vehicle 10 is actuated in such a way that the parking operation is interrupted. The control unit 42 proceeds likewise when no distance d was determined, that is, for example, when a negative distance value of the distance d is reported. The control unit 42 further transmits this information by means of radio frequency to the remote control unit 22 in order that the operator 20 can be alerted to the interruption. If the distance d is determined to be less than or equal to the maximum distance $d_{max}$, then—if appropriate, after a confirmation by the operator 20—the parking operation is continued.

In the final step S5, the method ends once the motor vehicle 10 has reached a parked position 52.

It should be noted that the steps S1 to S3 represent a distance determination method, which can also be carried out separately.

Figure 4:
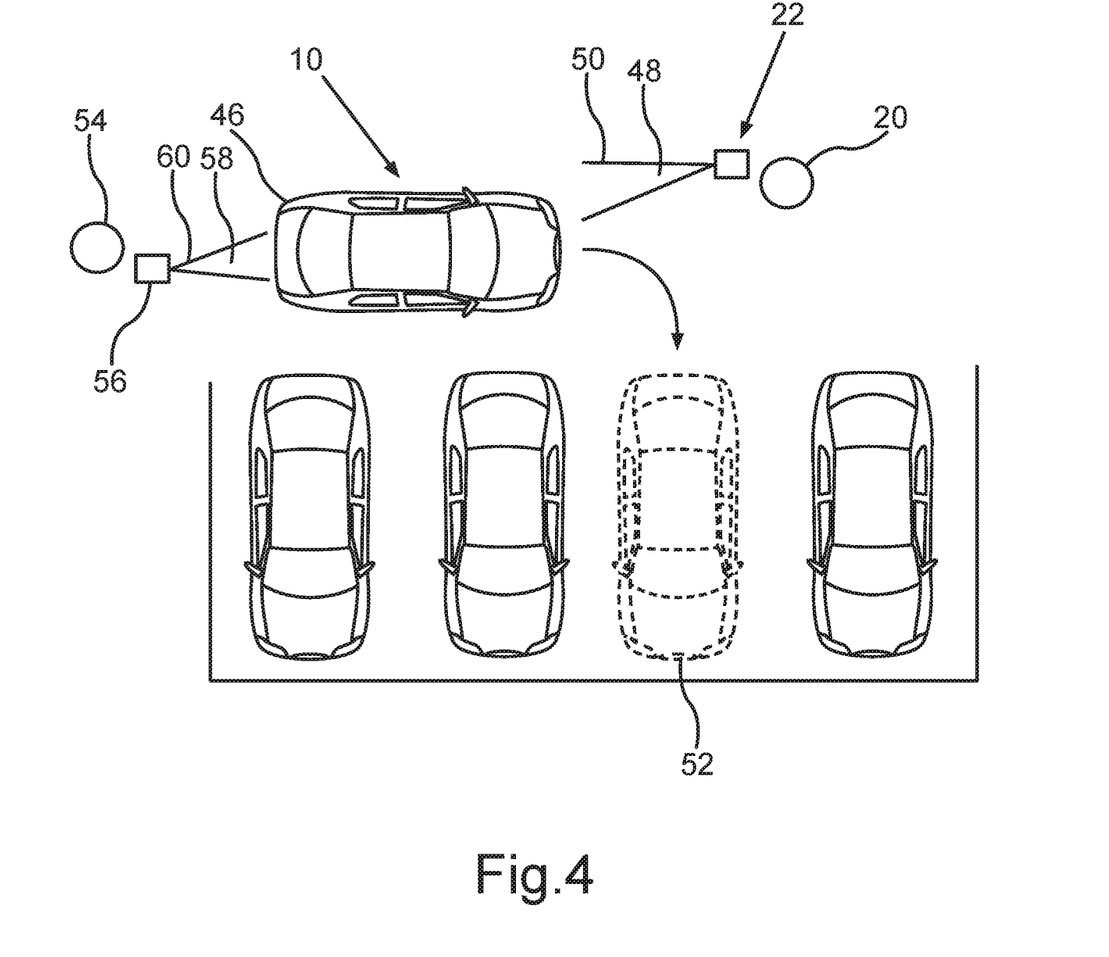
FIG. 4 shows a variant of the parking operation from FIG. 3.

As can be seen from FIG. 4, in a variant, the driver assistance system 12 is operated by another operator 54, who holds another remote control unit 56 of the driver assistance system 12. The additional remote control unit 56 is designed to emit additional coded optical signals in another angular range 58. The additional angular range 58 is bounded by another edge region 60, which is similar to the edge region 50. The remote control unit 54 can have any embodiment described herein.

Similarly to the above, the operator 20 can actuate or monitor the parking operation. However, the operator 20 can hand over the control authorization by means of the remote control unit 22 to the other operator 54 and the additional remote control unit 56 thereof. Accordingly, the other operator 54 can control/monitor the parking operation. As needed, it is now also possible for the other operator 54 to hand back the control authorization to the operator 20. It should be noted that, at all times, only one of the operators 20, 54 is authorized to control the motor vehicle 10. It should further be noted that preferably only the currently authorized operator 20, 54 can release the control authorization.

For remotely controlled driver assistance systems (e.g., piloted garage parking), it is required that, for the operation, a maximum distance from the remote control to the outer contour of the vehicle is not exceeded. Moreover, it is required that the remote control may not take place from inside the vehicle. Both serve to prevent any misuse of the function.

Nowadays, the position of the keyless entry ID transponder near the vehicle is determined via a plurality of antennas (e.g., in the door handles and on the trunk lid). The person who remotely controls the vehicle must carry this ID transponder.

In the positional determination using the keyless entry ID transponder, only a very small distance between the vehicle and the remote control is possible. Moreover, a physical separation between the keyless entry ID transponder and the remote control unit is not allowed.

With the usual means for radio frequency-based distance measurement between the remote control unit and the vehicle (e.g., measurement of the radio frequency signal strength between the vehicle antenna and the remote control unit or measurement of the signal transit time of the remote control signal), it is possible to determine the distance of the remote control only very imprecisely, and/or the expense in terms of measurement engineering hardware is very high.

The area-view cameras installed in the vehicle (e.g., top view, area view) detect, by image processing around the vehicle, the current position of the remote control unit outside the vehicle and compute the distance by means of image processing algorithms.

In this case, for detection of the remote control unit, the remote control unit emits optical pulses (visible and non-visible light flashes) coded for this purpose. These pulses are coded in the signal sequence in such a way that the active remote control unit of the vehicle can be identified.

With the measures described above, a precise determination of the distance between the remote control unit and the vehicle is possible. The position of the remote control unit with respect to the vehicle can also be determined in this way. A further restriction of the position of the remote control unit is possible in this case (e.g., function is only possible when the remote control is in back of the vehicle). By way of this method, it is possible to detect whether the remote control is pointed in the direction of the vehicle, that is, whether the focus of the operator is directed at the vehicle. It is advantageous that, for example, smartphones can be used as remote control units, in which, for example, the LED of the camera function can be used as an emitter of the optical pulses. Therefore, no special hardware is necessary for the remote control.

The invention claimed is:

1. A remote control method for remote control of a driver assistance system of a motor vehicle by a remote control unit assigned to the motor vehicle, wherein the driver assistance system is configured to actuate the motor vehicle for carrying out an autonomous or piloted parking operation and which comprises an optical sensor apparatus having at least one sensor, an analysis unit, and a control unit, comprising:

a) emission of a coded optical signal by the remote control unit;
b) detection of a surrounding region (E) of the motor vehicle by the at least one sensor in order to detect the coded optical signal and in order to acquire optical sensor data;
c) analysis of the sensor data by the analysis unit, wherein a distance (d) between the remote control unit and the motor vehicle is determined by image processing algorithms and by one of an intercept theorem and a stereoscopic principle; and
d) actuation of the motor vehicle by the control unit as a function of the determined distance (d);
wherein actuation of the motor vehicle comprises performing the parking operation when the distance (d) is less than a predetermined maximum distance ($d_{max}$), and interrupting the parking operation when the distance (d) is greater than the predetermined maximum distance ($d_{max}$);
and wherein the coded optical signal is displayed as a coded optical marker.

2. The method according to claim 1, wherein, in step a), the coded optical signal is emitted by a coded optical marker and/or a display and/or a lamp apparatus, which emit or emits coded optical pulses.

3. The method according to claim 1, wherein the remote control unit is a mobile telecommunication device.

4. The method according to claim 1, wherein, in step b), the at least one sensor is a camera unit, which outputs image data as sensor data.

5. The method according to claim 1, wherein, in step c), the distance (d) is determined on the basis of the sensor data of only one sensor and a distance reference or in that, in step c), the distance (d) is determined on the basis of the sensor data of at least two sensors, the sensor regions of which (FOV; FOV1; FOV2, . . . , FOVn) overlap.

6. The method according to claim 1, wherein, in step d), the control unit actuates the motor vehicle to discontinue the parking operation when the control unit determines that the distance (d) is greater than a predetermined maximum distance ($d_{max}$) and in that, in step d), the control unit actuates the motor vehicle to discontinue the parking operation when the analysis unit determines that no coded optical signal is detected or that the coded optical signal is detected outside of a predetermined detection region.

7. The method according to claim 1, wherein, in step d), the control unit actuates the motor vehicle to proceed with the parking operation when the control unit determines that the distance (d) is less than or equal to a predetermined maximum distance ($d_{max}$), and/or in that, in step d), the control unit actuates the motor vehicle to proceed with the parking operation when the analysis unit determines that a coded optical signal is detected.

8. The method according to claim 1, wherein the driver assistance system comprises another remote control unit, configured to emit additional coded optical signals, wherein, at the discretion of an operator, either the coded optical signals of the remote control unit or the additional coded optical signals of the other remote control unit are taken into consideration or emitted.

9. A driver assistance system configured to actuate a motor vehicle for carrying out an autonomous or a piloted parking operation, wherein the driver assistance system comprises:
a remote control unit, which is assigned to the motor vehicle and is configured to emit a coded optical signal;
an optical sensor apparatus configured to detect a surrounding region (E) of the motor vehicle to acquire sensor data;
an analysis unit configured to determine, by image processing algorithms on the basis of the sensor data and by one of an intercept theorem and a stereoscopic principle, a distance (d) between the remote control unit and the motor vehicle;
and a control unit configured to actuate the motor vehicle as a function of the determined distance (d); wherein actuation of the motor vehicle comprises performing the parking operation when the distance (d) is less than a predetermined maximum distance ($d_{max}$), and interrupting the parking operation when the distance (d) is greater than the predetermined maximum distance ($d_{max}$); and wherein the coded optical signal is displayed as a coded optical marker.

* * * * *